June 22, 1965  W. H. RHODES  3,190,014
TEACHING AID
Original Filed March 14, 1961  2 Sheets-Sheet 1

WILLIAM H. RHODES
INVENTOR.

BY Thomas J. Holden
Donald M. Sandler
ATTORNEYS

WILLIAM H. RHODES
INVENTOR.

BY Thomas J. Holden
Donald M. Sandler
ATTORNEYS

3,190,014
TEACHING AID
William H. Rhodes, Baltimore, Md., assignor to Aircraft Armaments, Inc., Cockeysville, Md., a corporation of Maryland
Continuation of application Ser. No. 95,673, Mar. 14, 1961. This application Mar. 31, 1964, Ser. No. 356,697
2 Claims. (Cl. 35—48)

This invention relates to teaching aids, and more particularly to a teaching aid by which an instructor is provided with a current indication of how well his students are following this presentation of course material, thereby enabling him to pace such presentation with the students' comprehension.

To be effective, an instructor of a class of students must know, at least qualitatively, whether the class as a whole comprehends the course materials being covered. In particular, knowing whether the class understands a given point being presented by an instructor would permit him immediately to clarify or re-emphasize the point if necessary. Secure in the knowledge that such point is understood, an instructor could then confidently progress to the next point. Obviously, the time lag between presentation of a given point by an instructor and his ascertainment of its comprehension has an important bearing on the rate at which material is presented to the class, and on the effectiveness and time required to clarify or re-emphasize material not understood by the class. The problem, then, is to ascertain comprehension as soon as possible after presentation. One approach to such ascertainment is through the oral questioning of individual students in class; another, through written tests of all students. The former approach minimizes the time lag and permits immediatee clarification if necessary, but does not enable the instructor to relate comprehension of the student quizzed to the remainder of the class without time-consuming questions put to all students. The latter approach, while providing the instructor with a quantitative picture of comprehension by each student in particular, as well as the class in general, occurs too late in the teaching process to effectively correct particular points evidently not understood by students.

It is, therefore, a primary object of this invention to provide an instructor with apparatus by which the comprehension of students, individually and as a class, can be ascertained immediately after material has been presented in no more time than would be required to question a single student and note his comprehension. A further object of this invention is to provide apparatus of the class described wherein students are given evidence of whether the correct answer has been selected immediately after selection has been made.

Before describing the features of this invention by which the objects thereof are achieved, reference is made to the fact that an instructor frequently tests his class by presenting a question to which a multiple choice of answers is provided. The correct answer is a particular term of the series of alternative answers. It is with this type of testing that the present invention is concerned. Briefly, the apparatus disclosed herein, which provides an instructor with an indication of students' answers to a multiple choice question, includes a console for the instructor and a student station for each student in the class. A matrix of visual indicators on the console is identifiable with each student, and each indicator of a matrix is identifiable with the terms of the series of answers. Each student station is provided with answer switches, each of which is identifiable with the terms of the series of answers. Actuation by a particular student of the answer switch identifiable with a given term constitutes his selection of that term as his answer, and causes actuation on the console of the indicator identifiable with said given term in the matrix identifiable with said particular student. In this manner, the instructor is provided with an indication of the individual answers of the entire class in the form of a visual display.

A matrix of movable indicators identifiable with the terms of the series of answers is also provided on the console. Each of the last-mentioned indicators is moved by an amount proportional to the number of visual indicators identifiable with the same term of the series that are actuated by the students. In this manner, the instructor is provided with an indication of the proportion or percentage of the entire class that has selected each term of the series.

The console is also provided with a selector switch having positions identifiable with the terms of the series. The instructor can preset this selector switch to the term that corresponds to the correct answer. Each student station is provided with a visual indicator which is actuated only when the student has actuated the answer switch identifiable with the same term to which the selector switch is set. In this manner, the student is provided with an indication that he has answered the question correctly.

Still other objects, features, and attendant advantages will become apparent to those skilled in the art from a reading of the following detailed description of one preferred physical embodiment constructed in accordance with the invention, taken in conjunction with the accompanying drawings wherein.

Figure 1:
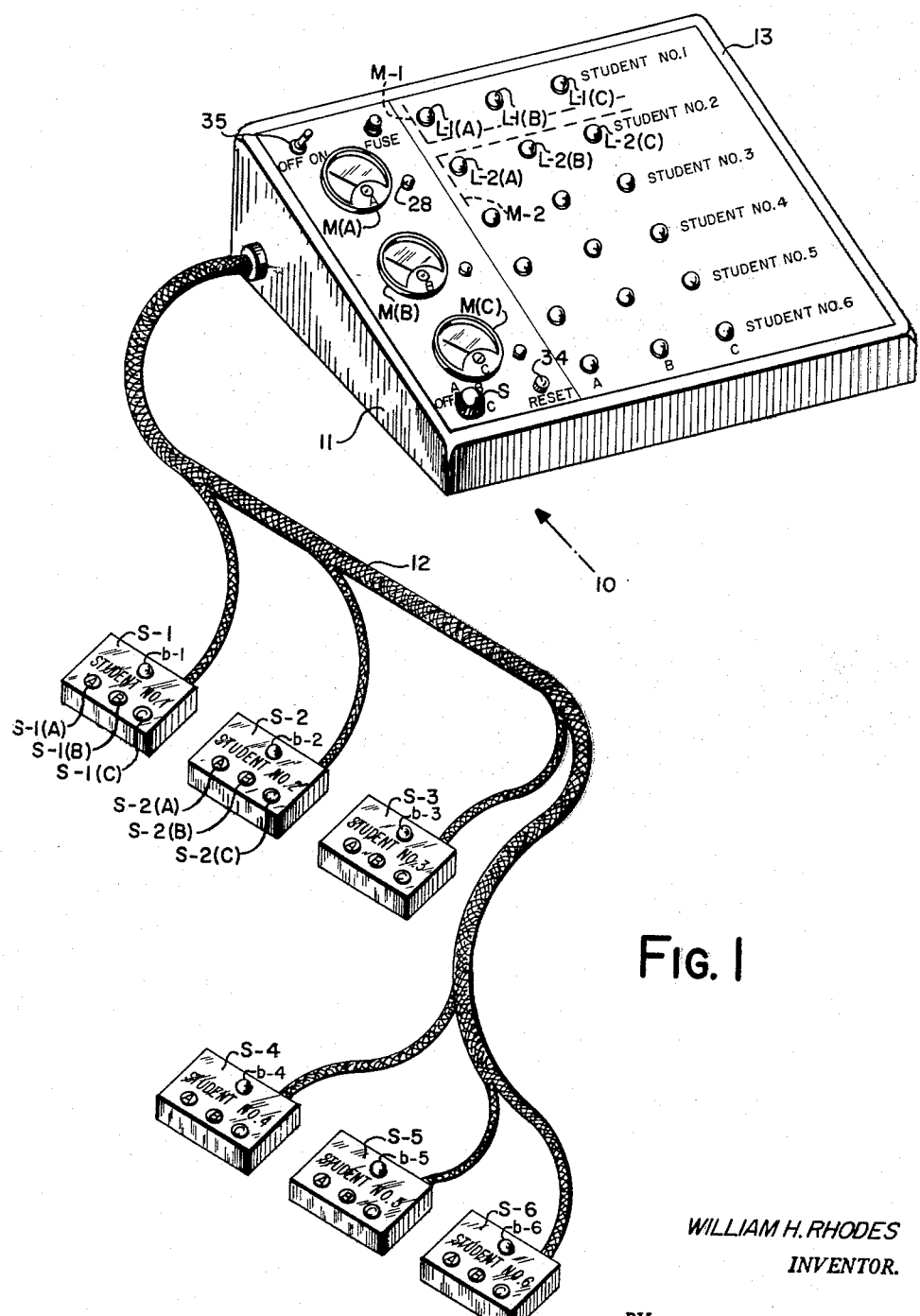
FIGURE 1 is a perspective showing of the instructor's console connected to six student stations.

Referring now to FIGURE 1, apparatus to provide an instructor of a class of students with an indication of their answers to a question to which the correct answer is a particular term of a series of possible answers presented by the instructor to the students is indicated generally at 10. Apparatus 10 includes, as component parts, instructor console 11 connected by means of conduits 12 to a plurality of student stations S–1, S–2, S–3, etc. remote from console 11. Actually, apparatus 10 may be installed in a classroom with console 10 at the instructor's desk or lecturn, and student stations S–1, S–2, S–3, etc. installed at the various desks or seats in the classroom.

Consider a situation wherein an instructor teaching arithmetic has explained that the cube of a number is obtained by taking the product of the number with itself three times; and then wishes to ascertain comprehension of the class by asking if $2^3$ is: (A) 4; (B) 6; or (C) 8. The correct answer, 8, is the third term of the series of possible answers. Using apparatus 10, each student makes his selection, and the instructor can immediately ascertain the terms selected and the proportion of the class that has selected each term. With this information, the instructor can determine which students need clarification of the material just presented, and whether those not understanding the material constitute an appreciable segment of the class. Thus, the instructor immediately nows whether he can progress to the next point of the course assured that the class as a whole understands the point previously covered, or whether further class explanation is required.

Returning now to FIGURE 1, each student station is provided with answer switches identifiable with the terms of the series of possible answers. Thus, station S–1 has answer buttons S–1 (A), S–1 (B), and S–1 (C) identifiable with terms (A), (B), and (C), respectively. These buttons actuate the answer switches. Likewise, station S-2 has answer buttons S-2 (A), S-2 (B), and S-2 (C), etc. Each student responds to the question asked by pressing the answer button identifiable with the term in the series which he believes to be the correct answer. Pressing an answer button closes a switch as will be described later. For example, if the student at station S-1 believes that $2^3$ is 4, he presses button S-1 (A).

At console 11, panel 13 is viewable only by the instructor. On panel 13, matrices of three light bulbs or lamps are identifiable with the student stations. Thus, lamp matrix M-1 is identifiable with student station S-1; lamp matrix M-2 is identifiable with student station S-2; etc. Each matrix has lamps identifiable with the terms of the answer series. Thus, lamps L-1 (A), L-1 (B), and L-1 (C) of matrix M-1 are identifiable with terms (A), (B), and (C), respectively.

Circuit means described hereinafter are employed so that current is caused to flow through the lamp on the console identifiable with a given term of the answer series in a matrix identifiable with a particular station when the student at that station pushes the answer button identifiable with such given term. Thus, when the student at station S-1 pushes button S-1 (C), lamp L-1 (C) of matrix M-1 is lit, and indicates to the instructor that student #1 believes that $2^3$ is 8. In like manner, the bulbs in the other matrices will light upon selection of answers by other students.

A matrix of meters is also mounted on panel 13. The meters are identifiable with the terms of the answer series: meter M(A) is identifiable with term (A), meter M(B) is identifiable with term (B), and meter M(C) is identifiable with term (C). Additional circuit means is installed in console 11 so that the indicator of a meter identifiable with a given term is deflected by an amount proportional to the ratio that the number of lit lamps identifiable with the given term bears to the total number of lamp matrices. Now the embodiment shown in FIGURE 1 has six lamp matrices. Lamp L-1 (A) of matrix M-1, lamp L-2 (A) of matrix M-2, etc. are the lamps of the matrices identifiable with term (A) of the answer series; lamp L-1 (B) of matrix M-1, lamp L-2 (B) of matrix M-2, etc. are the lamps of the matrices identifiable with term (B), etc. Thus, if only students #1 and #2 have selected term (C) as their answer, only lamps L-1 (C) and L-2 (C) in the (C) column of panel 11 will be lit. By calibrating meter M(C) such that full scale deflection occurs when all of the lamps identifiable with term (C) of the answer series are lit (six in the case illustrated), full scale deflection will represent 100% of the students. In the situation outlined above, the indicator of meter M(C) will be deflected 2/6 of full scale deflection to indicate to the instructor that one-third of the class knows the correct answer. In like manner, the instructor can ascertain, from meters M(A) and M(B), the percentage of the class selecting each of the two wrong answers.

To feed back to students selecting the correct answer verification of that fact, the following components are utilized. A light bulb is mounted on each student station, and is shown as bulb $b-1$ at station S-1, $b-2$ at station S-2, etc. A selector switch S is mounted on panel 13 of console 11 out of view of the students. This selector switch has positions identifiable with the terms of the answer series. Additional circuit means is provided for causing current to flow through the bulb at a particular station when the student there depresses the answer button identifiable with the same term with which the position of the selector switch is identifiable. Thus, in the example above described, when student #1 depresses button S-1 (C), bulb $b-1$ at station S-1 is lit along with lamp L-1 (C) on panel 13. The answer buttons are spring loaded so that actuation of the switch occurs upon depression of the button. Release of a button permits the spring (not shown) to return the button to its normal position, and a holding circuit described below becomes effective to maintain current flowing through the lamp. In this manner, the condition of the buttons does not convey information as to which was depressed to cause the bulb at the station to light.

Figure 2:
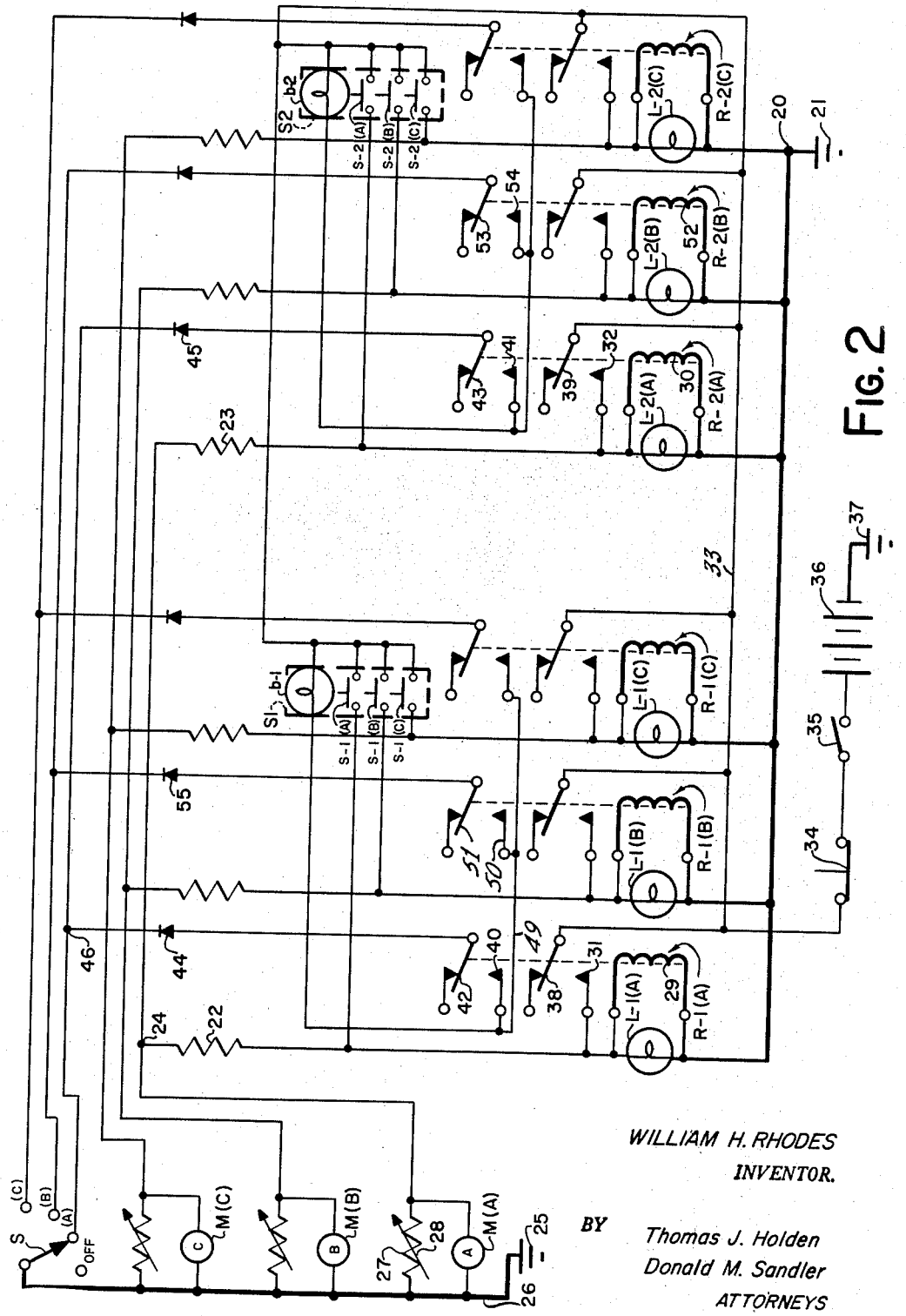
FIGURE 2 is a wiring diagram for the console and two student stations.

Having outlined the operation of apparatus 10, circuit means for achieving such operation is shown in FIGURE 2. It is understood, of course, that any number of student stations, and any number of terms in the series of possible answers could be used, and the showing of six stations and three terms is by way of illustrating the principle involved only. Reference is now made to FIGURE 2, which for purposes of simplifying the description and drawing, shows two student stations S-1 and S-2 set up to operate with three term multiple choice questions.

As shown in FIGURE 2, lamps L-1 (A) and L-2 (A) have common terminal 20 grounded at 21. Resistors 22 and 23 are connected in series with lamps L-1 (A) and L-2 (A), respectively, and have common terminal 24 connected to one terminal of meter M(A). The other terminal of meter M(A) is grounded at 25 through lead 26. Meter M(A) is shunted by variable resistor 27 which is used to calibrate the meter by operation of knob 28.

Coil 29 of D.P.D.T. relay R-1 (A) is connected in parallel with lamp L-1 (A), and coil 30 of D.P.D.T. relay R-2 (A) is connected in parallel with lamp L-2 (A). Normally open contact 31 of relay R-1 (A) is connected to lamp L-1 (A) and to one side of switch S-1 (A) at student station S-1; and normally open contact 32 of relay R-2 (A) is connected to lamp L-2 (A) and to one side of switch S-2 (A) at student station S-2. The other sides of switches S-1 (A) and S-2 (A) are connected through lead 33 to one side of normally closed reset switch 34 located on panel 13 of console 11. The other side of reset switch 34 is connected through on-off switch 35 to a D.C. source 36 represented as a battery which is grounded at 37. Center poles 38 and 39 of relay R-1 (A) and R-2 (A), respectively, are each connected to lead 33.

In a similar manner, lamps L-1 (B) and L-2 (B) are connected to meter M(B), relay R-1 (B) and switches S-1 (B) and S-2 (B); and lamps L-1 (C) and L-2 (C) are connected to meter M(C), relay R-2 (B) and switches S-1 (C) and S-2 (C).

The other normally open contact 40 of relay R-1 (A) is connected to one side of bulb $b-1$ at student station S-1; and the other normally open contact 41 of relay R-2 (A) is connected to one side of bulb $b-2$ at student station S-2. The other sides of bulbs $b-1$ and $b-2$ are connected to lead 33. The other center poles 42 and 43 of relays R-1 (A) and R-2 (A), respectively, are connected to divides 44 and 45, respectively, and then to common terminal 46 at position (A) of switch S. The movable arm of switch S is connected to lead 26. In a similar manner, bulbs $b-1$ and $b-2$ are connected to relays R-1 (B) and R-2 (B) through divides to position (B) of switch S; and bulbs $b-1$ and $b-2$ are connected to relays R-1 (C) and R-2 (C) through divides to position (C) of switch S.

In operation, suppose that switch 35 is closed. When the student at stations S-1 depresses switch S-1 (A), current flows from battery 36, lead 33, switch S-1 (A), through lamp L-1 (A) and coil 29 to ground 21, and through meter M(A) to ground 25. As a result, lamp L-1 (A) is lit, and relay R-1 (A) is actuated whereby outer pole 38 engages contact 31. When the student releases switch S-1 (A), relay R-1 (A) holds pole 38 in engagement with contact 31 and maintains current through lamp L-1 (A) and meter M(A). Thus, the instructor is aware that the student at station S-1 has selected answer (A). In like manner, the instruction is aware of the selection by the student at station S-2 when he depresses an answer button.

It should be noted that meter M(A) is in series with a parallel circuit composed of lamps L-1 (A) and L-2 (A) so that the current flowing through meter M(A) is the sum of the currents flowing through each of the lamps. Adjustment of knob 28 when current flows through lamps L-1 (A) and L-2 (A) permits the instructor to calibrate meter M(A) for full scale deflection. Likewise, meters M(B) and M(C) can be calibrated when lamps L-1 (B) and L-2 (B), and lamps L-1 (C) and L-2 (C), respectively, have current flowing therethrough. If, in response to a question, the student at station S-1 actuates switch S-1 (C) and the student at station S-2 actuates switch S-2 (A), lamps L-1 (C) and L-2 (A) would have current passing therethrough, and meters M(A) and M(C) would each indicate 50% of the class chose answers (A) and (C). Meter M(B) would read zero indicating no student chose answer (B).

Suppose now that answer (A) is the correct answer and that prior to asking the question, selector switch S is positioned by the instructor so that the movable arm contacts position (A) as shown in FIGURE 2. When the student at station S-1 actuates S-1 (C) energizing coil 29 and lighting lamp L-1 (A), pole 42 of relay R-1 (A) engages contact 40. This completes a circuit from battery 36, through lead 33 and bulb b-1, across pole 42 and contact 40 through diode 44 to node 46 and the movable position (A), to lead 26, and then to ground 25. Thus, the bulb at each student station is lit when the student there actuates the switch identified with the same term with which the position of selector switch S is identified.

The diodes in the circuit prevent a false indication to a student that his answer is correct when he has actuated an incorrect answer switch. Suppose the instructor has selected answer (A) to be the correct answer and that after student #1 has selected answer (B), he also selects answer (A), thereby causing bulb b-1 to be lit. At the console, lamps L-1 (A) and L-2 (B) would be lit to indicate to the instructor that student #1 took two selections to obtain the correct answer. Under the above circumstances, center pole 51 of relay R-1 (B) is engaged with contact 50. Note that lead 49 connects contacts 40 and 50. Now suppose that student #2 actuates switch S-2 (B), causing lamp L-2 (B) to light, and indicates to the instructor that student #2 has answered incorrectly. Coil 52 of relay R-2 (B) is energized so that center pole 53 engages contact 54. Battery 36 is thus connected across bulb b-2 since contacts 50, 51, and 40, 42 are engaged. Bulb b-2 does not light, however, because diode 55 prevents the flow of current. Thus, student #2 is not given a false indication that he has selected the correct answer when he selects answer (B).

While the invention has been described with respect to a specific illustrative embodiment thereof, it will be apparent to those skilled in the art that various modifications and improvements may be made without departing from the scope and spirit of the invention. Accordingly, the invention is not to be limited by this illustration embodiment, but only by the scope of the appended claims.

This application is a continuation of copending application S.N. 95,673, filed March 14, 1961, now abandoned.

That which is claimed is:

1. Apparatus to provide an instructor or observer of a class of students with an indication of their response to a multiple choice question comprising:
   a student station for each student;
   each station having a different actuatable student answer switch identifiable with each choice;
   actuation by a student of the student answer switch identifiable with a given choice constituting the student's selection of said given choice as his response;
   an instructor's console;
   a different matrix of lamps on said console identifiable with each student station;
   each lamp in a matrix being identifiable with and indicative of a different choice and being operatively connected in illumination responsive relation to its respective said answer switch independently of actuation of any of the answer switches of a different said station and matrix of lamps;
   separate impedance associated with each individual student answer switch;
   all of the impedances associated with answer switches identifiable with the same choice being equal;
   a different meter on the console identifiable with each choice and having a movable indicator whose displacement is a measure of current flowing therethrough;
   means for connecting said student answer switches to a source of E.M.F.;
   the console lamps identified with a particular choice being arranged in parallel circuit arrangement with one another and in series with the associated respective said console meter;
   means for connecting each respective said console choice indicator lamp in closed circuit relation with a source of E.M.F. in response to actuation of the respective said student answer switches associated with the respective said particular choice;
   means operatively connected with each said student answer switch and responsive to actuation of the respective said answer switch to connect the respective associated impedance in closed circuit relation with a source of E.M.F. and the respective meter identifiable with the respective particular choice for effecting an incremental meter indication as a function of the total number of answer switches actuated for any given choice, said means for connecting said answer-switch-associated impedances and associated meters in closed circuit relation with a source of E.M.F. and said means for connecting the console choice indicator lamps in closed circuit relation with a source of E.M.F. comprising a plurality of relays, each student answer switch having a separate said relay with an electroresponsive actuating element connected with the respective said student answer switch.

2. Apparatus according to claim 1 wherein said console choice indicator lamps are arranged in parallel circuit relation with the electroresponsive actuating element of the respective associated said relay, each of said impedances being in series connection with the electroresponsive actuating element connected to its associated answer switch.

References Cited by the Examiner

UNITED STATES PATENTS

| | | | |
|---|---|---|---|
| 1,650,247 | 11/27 | Turck | 235—52 |
| 2,562,179 | 7/51 | Dorf | 35—48 |
| 2,654,163 | 10/53 | Reynolds | 35—48 |

JEROME SCHNALL, *Primary Examiner.*

LAWRENCE CHARLES, *Examiner.*